United States Patent [19]
Onlin et al.

[11] Patent Number: 5,221,325
[45] Date of Patent: Jun. 22, 1993

[54] PROCESS FOR RECOVERING SILVER OXIDE AND METALS FROM SPENT SILVER OXIDE BUTTON CELLS

[75] Inventors: Tyngbin Onlin; Bih-Shyang Huang; Pak-Hing Lee; Tei-Chih Cheau, all of Hsinchu, Taiwan

[73] Assignee: Industrial Technology Research Institute, Taiwan, China

[21] Appl. No.: 845,272

[22] Filed: Mar. 3, 1992

[51] Int. Cl.⁵ .................................................. C22B 3/00
[52] U.S. Cl. .......................................... 75/419; 75/422; 75/425; 75/634
[58] Field of Search ................... 75/634, 419, 422, 425

[56] References Cited

U.S. PATENT DOCUMENTS 5,120,409  6/1992  Hanulik ............................... 204/112

FOREIGN PATENT DOCUMENTS 53-83031  7/1978  Japan ...................................... 75/634

Primary Examiner—Melvyn J. Andrews
Attorney, Agent, or Firm—Ladas & Parry

[57] ABSTRACT

A process for recovering silver oxide and metals from a spent silver oxide button cell. The process relates to a physical process which consists of a heating and a cooling process to separate the shell and the content (silver, silver oxide) of the spent silver oxide cell, so that silver oxide, silver and other metals such as zinc, iron and nickel can be recovered and reused.

3 Claims, 3 Drawing Sheets

PROCESS FOR RECOVERING SILVER OXIDE AND METALS FROM SPENT SILVER OXIDE BUTTON CELLS

BACKGROUND OF THE INVENTION

The present invention relates to a process for recovering silver oxide and metals from spent silver oxide button cells, and particularly to a physical process to separate its shell and content to recover silver oxide, silver, zinc, iron and nickel.

Generally, button cells are divided into four groups, i.e., silver oxide cells, mercury cells, lithium cells and alkali-manganese cells. A silver oxide cell's content is silver oxide and silver metal, and the shell is made of zinc, iron and nickel. Therefore, it is necessary to recover silver oxide, silver and other metals from spent silver oxide button cell so as to reuse the metals therefrom.

When conventional chemical process is used to recover the silver oxide and silver from spent silver oxide button cells, however, other valuable metals such as iron, zinc and nickel are disposed of without recovery.

In the conventional chemical process, aqua regia, a composition of concentrated nitric acid and hydrochloric acid, is used to dissolve the shell of the cell, and a protective film of silver chloride is formed on the surface of the silver metal by a reaction with hydrochloric acid. The silver oxide and silver are recovered, and the rest is disposed as an effluent. However, the effluent contains some highly contaminating substances, i.e., the aqua regia which contains strong acid may produce waste water and waste gas such as $NO_x$. Consequently, it is difficult to treat these pollutants to meet effluent standards and also this process becomes accordingly more complicated and costly.

After a pyrometallurgic purification of the silver oxide and silver (by $Na_2CO_3+C$, at 1000° C.) to 95% crude silver, the crude silver is further refined to silver ingot with a purity of 99.99% by a conventional process. Then the silver ingot can be sold and reused (see FIG. 1).

SUMMARY OF THE INVENTION

Therefore, it is an object of the present invention to provide a physical process, which will not produce any pollutants, for recovering the silver oxide and metals from the spent silver oxide button cell.

To attain the object of the present invention, the spent cell is first broken up by a mechanical means. Then, the spent cell is heated to a high temperature, and transferred immediately to a strongly agitated cold water bath, so that the shell and the content of the spent cell are separated. The solid, which contains silver oxide, silver, iron, zinc and nickel, is separated from the water, and then is further separated magnetically into magnetic substances and non-magnetic substances.

BRIEF DESCRIPTION OF THE DRAWINGS

The object, features, and advantages of the present invention can be better understood from the following detailed description, example, and drawing, wherein.

DETAILED DESCRIPTION OF THE INVENTION

In the present invention, the spent silver oxide cell is fractured by using a mechanical means, such as striking mechanically. After that, the fragmented spent cell is heated and dried in a heating furnace to a temperature of higher than 100° C., and immediately transferred to a cold water bath which is agitated violently at a temperature of less than 30° C. Since the spent cell is transferred from the hot state to the cold state in an instant, the shell (iron, zinc and nickel) and the content (silver oxide, silver) of the spent cell are easily separated.

Figure 1:
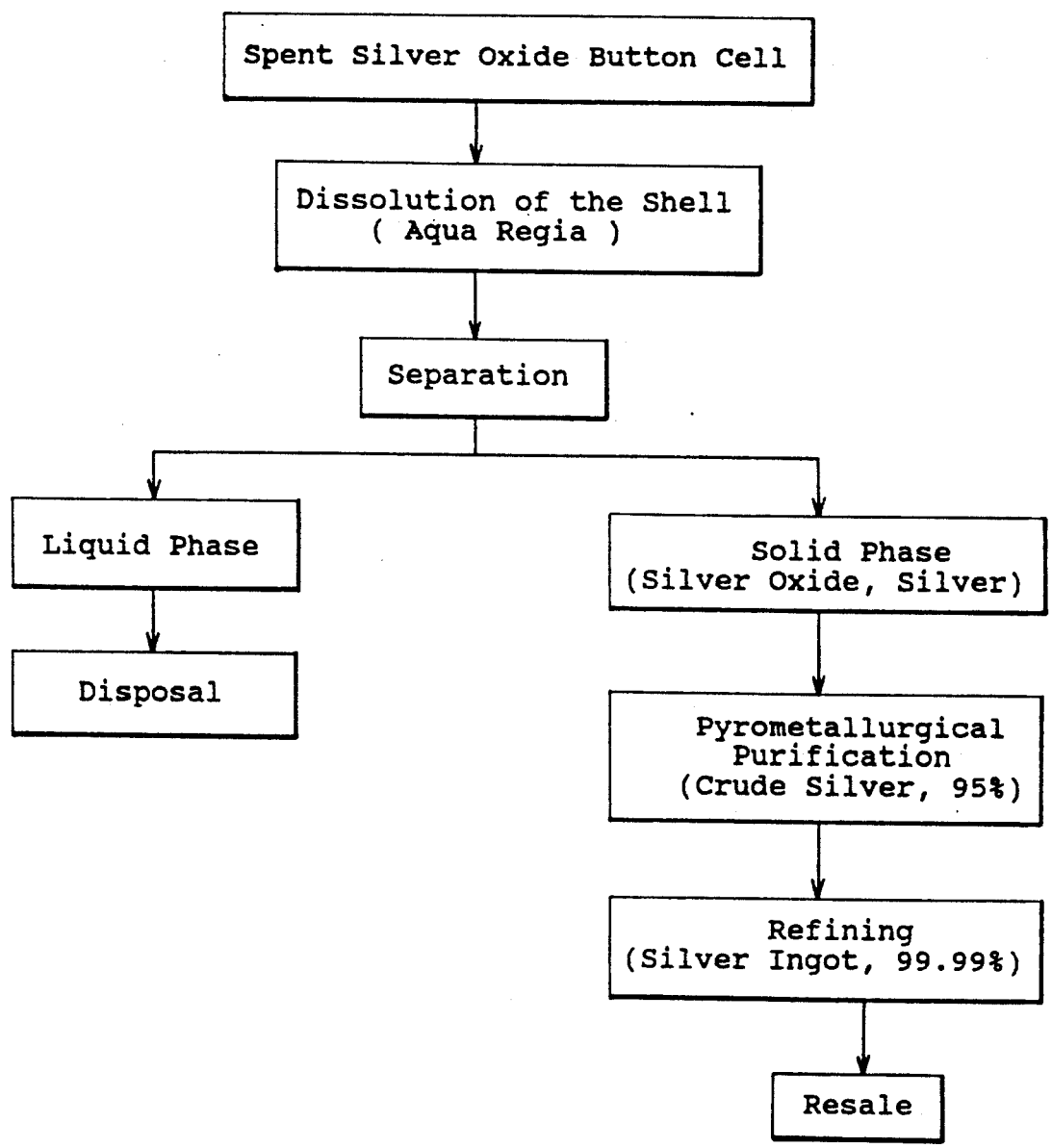
FIG. 1 is a flowchart of the conventional chemical process.
Figure 2:
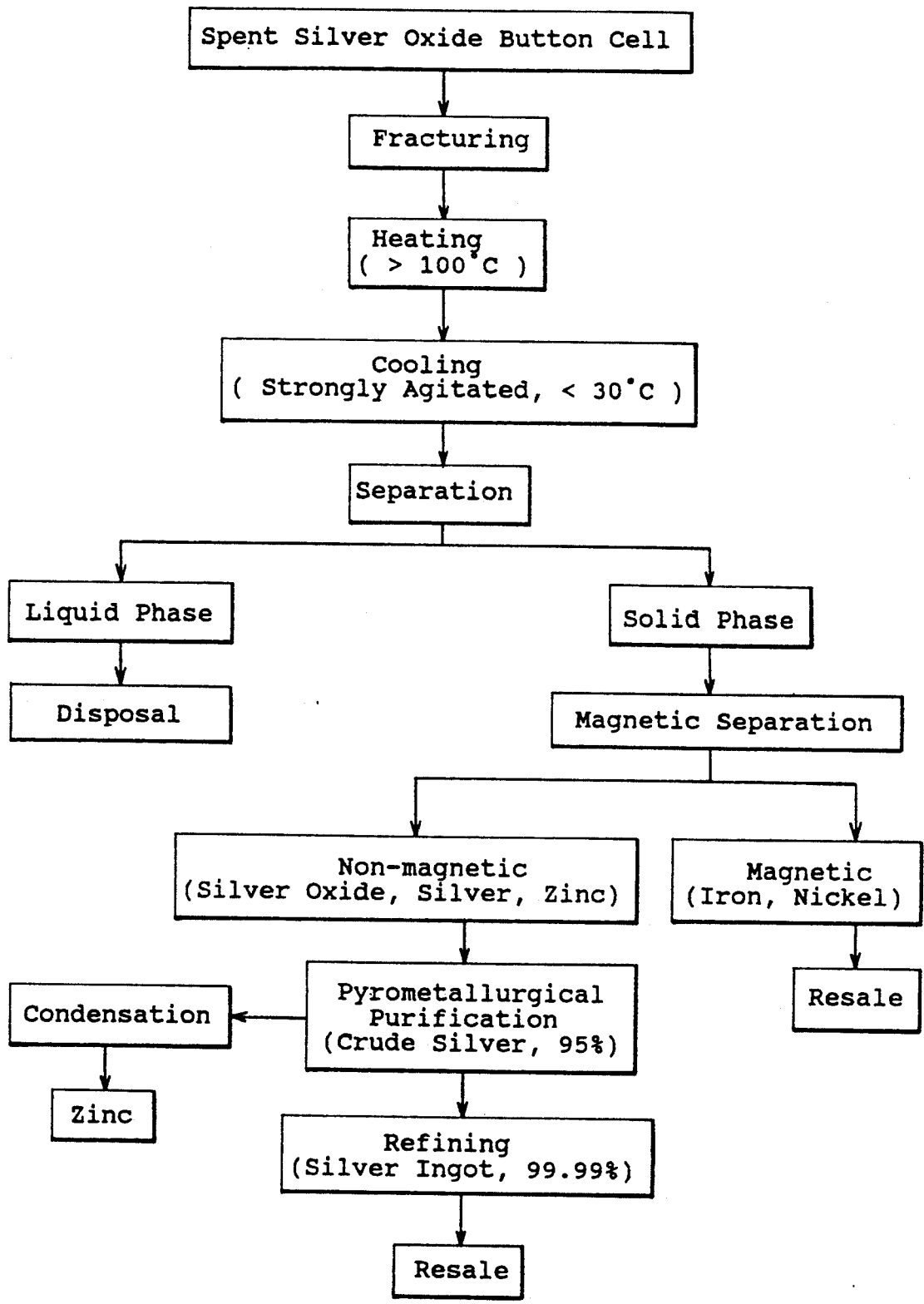
FIG. 2 is a flowchart of the present invention.

After the separation of the solid phase from the liquid phase, silver oxide, silver and zinc which are non-magnetic, and iron and nickel which are magnetic, are separated by a magnetic separation process. The iron and nickel metals can be sold and reused without any purification, however, zinc metal can be condensed and separated from non-magnetic metals by a pyrometallurgic purification process, and silver oxide and silver are recovered by a conventional process (see FIG. 2).

Since the present invention relates to a physical process, it will not cause any pollution problems. Furthermore, the present invention also recovers other valuable metals, which are disposed in the conventional process, such as iron, zinc and nickel. The advantages of the present process with comparison to the conventional chemical process are summarized in table 1.

TABLE 1

The comparison between conventional chemical process and the present invention

| Term | Chemical process | The present process |
| --- | --- | --- |
| Waste water | Yes (aqua regia) | No (water) |
| Waste gases | Yes | No |
| Waste treatment | Difficult | No need |
| Recovery of valuable metals (Fe, Zn, Ni) | No | Yes |
| Cost | High | Low |

EXAMPLE 1

Figure 3:
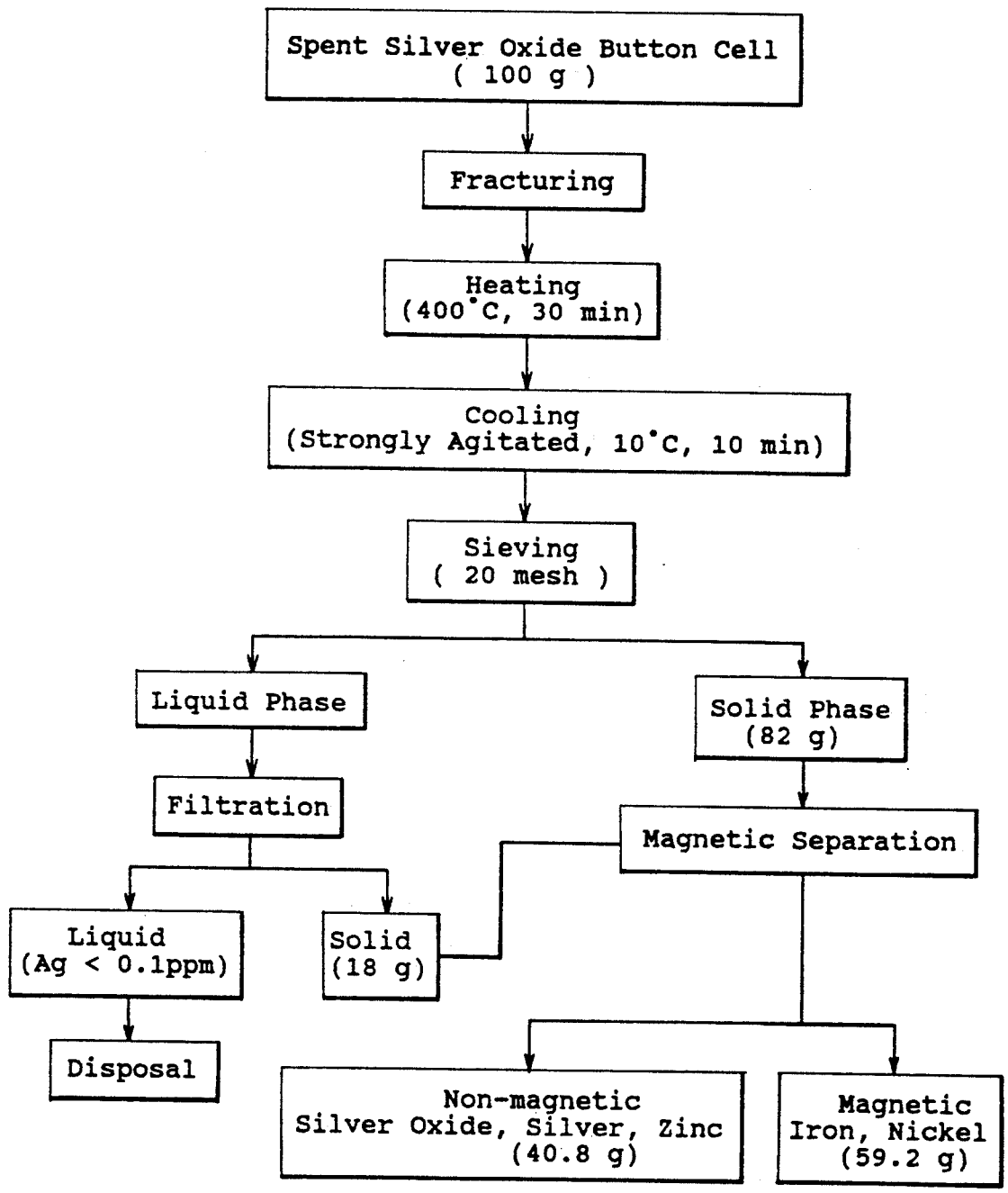
FIG. 3 is a flowchart of example 1 of the present invention.

100 g of spent silver oxide button cells were mechanically fractured into small pieces. The cell fragments were heated in a furnace to 400° C. for 30 minutes. Then, the cells were transferred immediately to a 10° C. cold water bath while the water was strongly agitated, so that the shell and the content of each spent cell were separated. After 10 minutes, the water was sieved by a 20 mesh sieve to remove larger pieces, and 82 g of solid phase was obtained. The remainder was filtered to obtain 18 g of solid phase, and the filtrate (water) was disposed of without treatment. The 100 g (82 g from sieving and 18 g from filtration) of solid phase was separated magnetically into magnetic substances and non-magnetic substances, yielding 59.2 g of magnetic iron and nickel, and 40.8 g of non-magnetic silver oxide, silver and zinc (see FIG. 3). The recovered silver oxide, silver and other metals may be treated by conventional process so that they can be sold and reused.

We claim:

1. A process for recovering silver oxide, silver, zinc, iron and nickel from a spent silver oxide button cell consisting of a shell comprising iron, zinc, and nickel and content thereof comprising silver oxide and silver, the process comprising:

(a) fracturing the spent silver oxide button cell into cell fragments by mechanical means;

(b) heating said cell fragments to a temperature of more than 100° C.;
(c) transferring said cell fragments to a cold water bath at a temperature of below 30° C. wherein said cold is agitated so as to form a liquid phase and a solid phase including silver oxide, silver, zinc, iron and nickel;
(d) separating said liquid phase from said solid phase; and
(e) separating magnetically said solid phase to recover non-magnetic silver oxide, silver and zinc, and magnetic iron and nickel.

2. The process as claimed in claim 1, wherein said cell fragments are heated to 400° C. for 30 minutes.

3. The process as claimed in claim 1, wherein said cell fragments are transferred to a cold water bath at 10° C. for 10 minutes.

* * * * *